United States Patent [19]
Goodwin

[11] 3,784,094
[45] Jan. 8, 1974

[54] MODULATING HEAT CONTROL

[76] Inventor: Ralph C. Goodwin, 1430 Ranier Ln. Rt. 2, Wayzata, Minn. 55391

[22] Filed: Sept. 18, 1972

[21] Appl. No.: 290,246

[52] U.S. Cl. ............................... 236/68 C, 236/91
[51] Int. Cl. ........................................... G05d 23/30
[58] Field of Search ................... 236/91, 68 C, 68 B

[56] References Cited
UNITED STATES PATENTS
2,168,178   8/1939   Thompson ............................ 236/91
3,171,596   3/1965   Furlong et al. .................... 236/91 X

*Primary Examiner*—William E. Wayner
*Attorney*—Everett J. Schroeder et al.

[57] ABSTRACT

A heat loss time throttling circuit is disclosed in which an outdoor heat loss detector subordinates the indoor thermostat by using a condition sensitive housing to encapsulate the outdoor heat loss detector and a heating element which actuates the outdoor loss detector in short time durations through an electrical source. The heating element is placed in series with the source and the indoor thermostat may be connected between the source and the heating element or between the control device and the heating element. An alternate form is disclosed for use with a cooling mechanism, both forms being relatively inexpensive in their construction.

9 Claims, 6 Drawing Figures

PATENTED JAN 8 1974
3,784,094
SHEET 1 OF 2
FIG. 1.
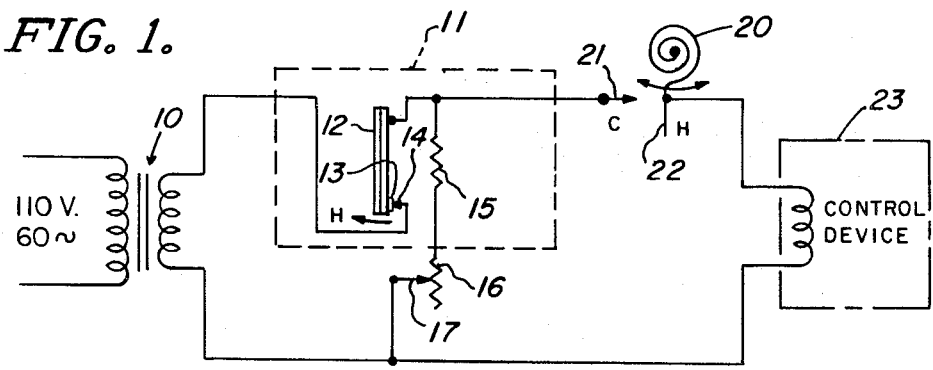
FIG. 2.
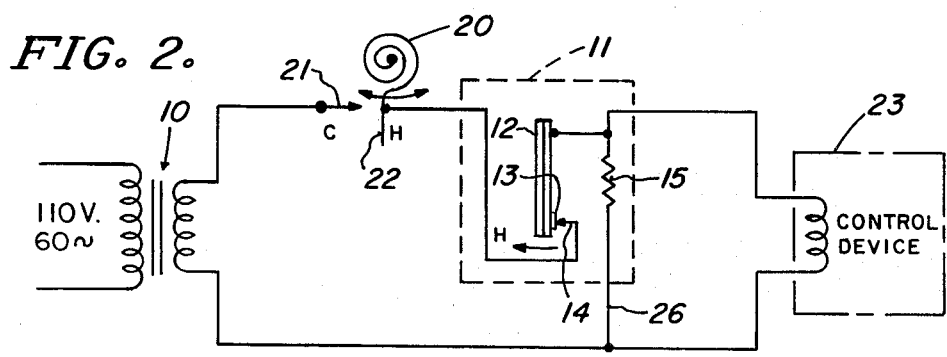
FIG. 3.
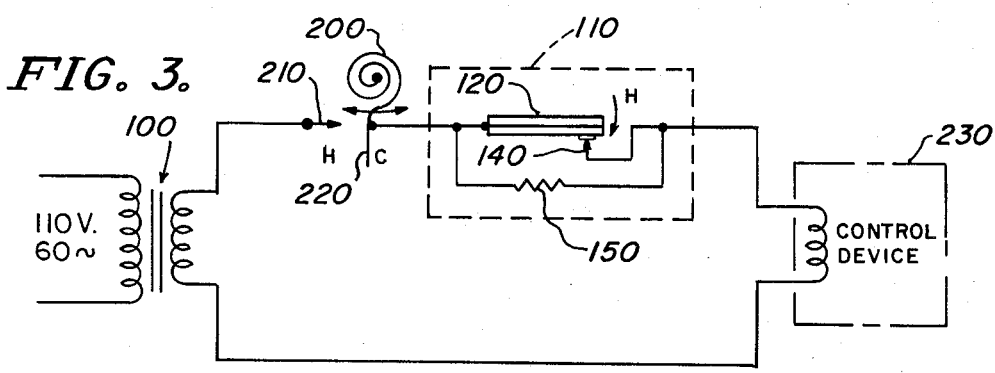
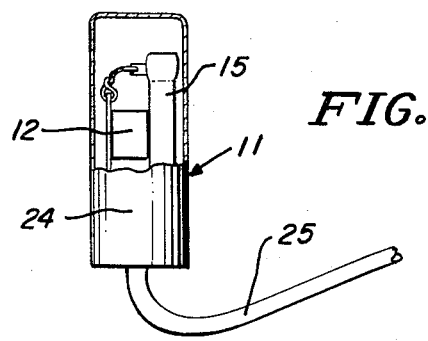
FIG. 6.

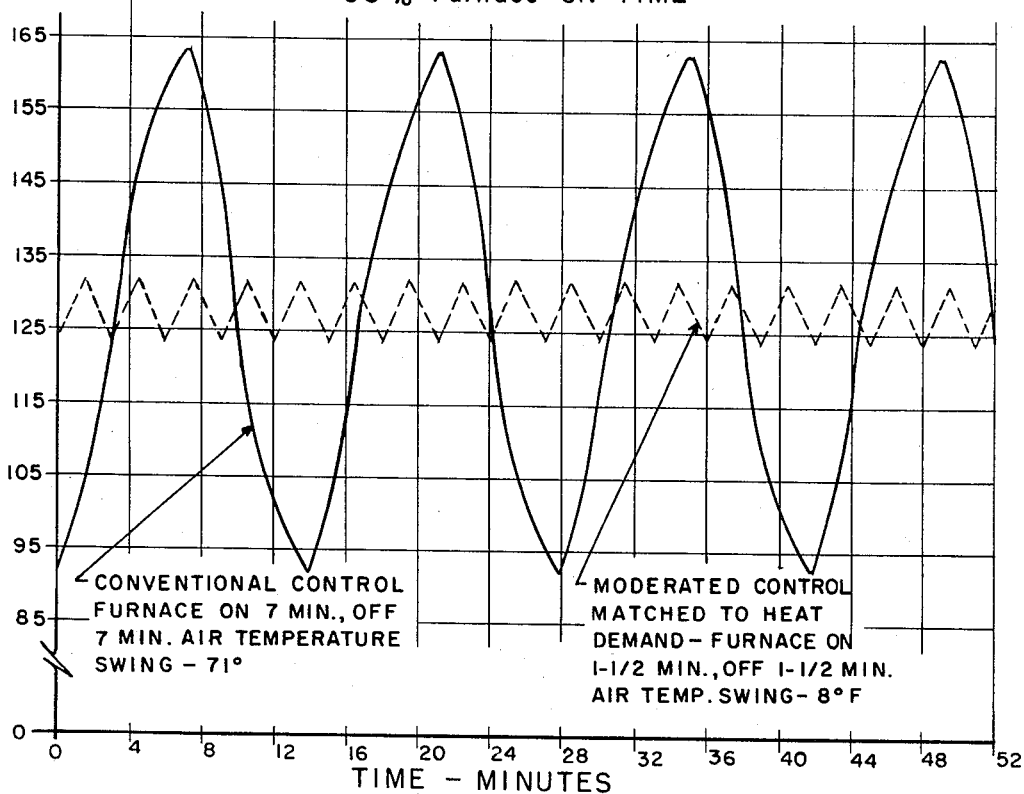

FIG. 4. COLD WEATHER 50% Furnace ON-TIME

CONVENTIONAL CONTROL FURNACE ON 7 MIN., OFF 7 MIN. AIR TEMPERATURE SWING – 71°

MODERATED CONTROL MATCHED TO HEAT DEMAND – FURNACE ON 1-1/2 MIN., OFF 1-1/2 MIN. AIR TEMP. SWING – 8°F

TIME – MINUTES

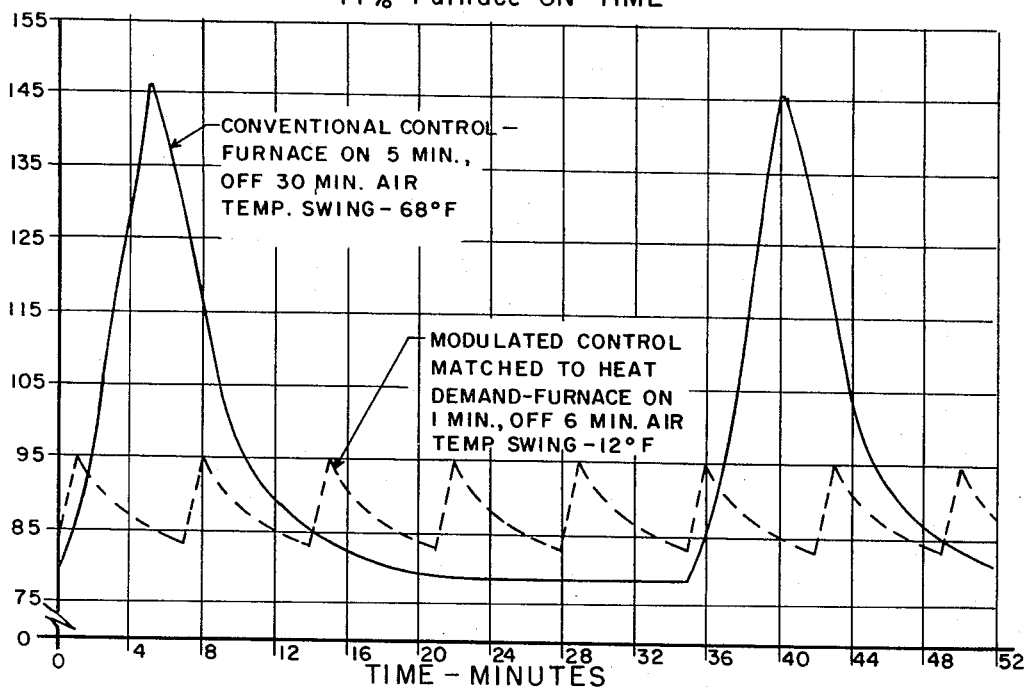

FIG. 5. MILD WEATHER 14% Furnace ON-TIME

CONVENTIONAL CONTROL – FURNACE ON 5 MIN., OFF 30 MIN. AIR TEMP. SWING – 68°F

MODULATED CONTROL MATCHED TO HEAT DEMAND – FURNACE ON 1 MIN., OFF 6 MIN. AIR TEMP SWING – 12°F

TIME – MINUTES

MODULATING HEAT CONTROL

This invention relates to the field of heat control and more particularly to a means of modulating a temperature changing mechanism.

The automatic heating system which is in general use today is generally controlled through the use of a room thermostat. The form of fuel to be consumed is delivered at full flow for whatever time is necessary until the thermostat reaches a condition completely cutting off the flow of fuel. However, the heat loss from the home or enclosure continues at a rate which is largely dependent upon the wind, temperature, and heat provided by the sun. Thus the furnace in consuming the fuel, must supply more heat than is being lost to compensate for the heat loss from the home while the furnace is off. Under these conditions, the room temperaure rises while the furnace produces heat through the introduction of fuel, and the room temperature drops while the furnace is not heating. The apparent sensation of the room temperature changes is accentuated by the relatively concentrated heat sources within each room.

Despite great improvements in the sensitivity of home thermostats and the use of heat anticipator features in a timed two position control mode to reduce the differential and to minimize overshooting temperatures, the basic on-off characteristics of the heat source persists. A typical gas fired forced air circulation heating system equipped with a high quality thermostat will generally operate with a 7 or 8 minute burning time and a 10 or 12 minute flame off cycle during cold weather. During the time the flame is on, the temperature of the air from the furnace plenum will climb to and level off at approximately 160° F. During the time the flame is off, the temperature of the plenum and circulating air will fall rapidly and level off at approximately 79° F. Under these conditions, the room occupants are quite conscious of this 81° F. swing in circulating air temperature.

Under typical operations, the average air temperature is 105° F. for the above conditions of cold weather but during milder weather, nearly the same peak temperature is experienced with respect to the circulating air with longer intervals of cool air, producing an average of about 90° F. to 95° F. The result in either case is a series of hot air blasts, alternating with contrasting periods of no heat input to counter the heat losses.

These shortcomings of the standard heating control have been recognized by numerous efforts to eliminate these temperature swings. Some furnace and control manufacturers have resorted to increasing the amount of thermostat anticipator heating which tends to shorten the burn cycle and reduces the magnitude of the air temperature swings. However, upon increasing the heating through the anticipator mechanism in the thermostat to substantially shorten the burn cycle, a negative effect is created by increasing the thermostat room temperature droop with increasing heating load. The result is that the room temperature drops uncomfortably as the weather gets colder, whereas it is desirable for the room temperature to increase slightly as the weather gets colder.

In an effort to overcome the room temperature droop, some control manufacturers have employed small thermostat heaters which are controlled by a sensor mounted outside the house or enclosure to reset the thermostat room temperature control point to a higher value as the weather gets colder. The need and cost of a special thermostat and larger transformer, in addition to the outside sensor, has limited the usefulness of this approach.

One other approach to the problem has been made by using special gas valves that modulate the size of the flame in proportion to the error between the thermostat set point and the room temperature. In other words, the size of the flame is directly proportional to the greater error produced by the colder weather. This solution produces a steady flow of heat proportional to the need with a continuous feedback of the results to modify the input. Such a system will give good results only if the thermostat sensitivity is high enough to limit the temperature droop to small values. The disadvantages of such a system are that a very sensitive proportional type thermostat is required along with an electronic amplifier and special modulating gas valve. Such units are generally considered more expensive than the normal controls for new installations. For instance, to change an existing standard control installation to one of the modulating valve type, one must discard the existing thermostat and valve, install the new gas valve in the gas line, and mount and wire the amplifier and new thermostat. Generally speaking, the total cost is prohibitive for most home owners. It is also known that the modulating gas valve can reduce the flame to about 25 percent of full burning capacity and for some smaller heat requirements, the valve must be operated essentially in the conventional on-off mode of operation. With the normal ratio of furnace capacity to maximum home heat loss, the practical effect of the limited modulation of the valve is to deprive the home owner of the improved control at temperatures of approximately 30° F. and above. One of the problems with this approach lies in the low stack temperatures produced by the reduced flame resulting in condensation and corrosion within the stack.

My invention provides two main functions independently of the room thermostat, by causing the furnace to operate with substantially shorter flame-on and flame-off intervals than would be provided by the thermostat only and by adjusting the duration and proportions of the intervals to time throttle the capacity of the furnace to an integrated value slightly in excess of the house heating needs, in response to the outside sun, wind and temperature conditions. Through the use of my modulating heat control, an even flow of heat is supplied to the house, resulting in an absence of heating peaks and an even temperature of the heat medium that automatically adjusts to a lower value in mild weather and a higher value in cold weather. The thermostat still performs its basic function of determining whether the rooms are too cold or too warm and the modulator influence on the thermostat is to reduce the frequency of operation and to somewhat reduce the anticipator heater effect because the current through the heater is interrupted by the modulator cycling action. Through testing of the various gas fired forced air heating systems and water systems it has been found that the basic principles of short pulsing and time throttling of the energy sources are equally applicable to all heating mediums and all energy sources of gas, oil, coal and electricity.

Whereas some of the prior art make use of temperature sensitive sensors which simply measure the temperature of an outside condition much like a thermometer, such an indication of the housing heating loss is valid where the sensor is not subjected to the suns rays or to the wind. However, if such a sensor is exposed to the wind, the signal from the sensor would be essentially the same as without the wind even though the heat losses from the house are substantially greater. By providing a source of heat within the sensor, the combined effects of external temperature, wind, and sun will influence the rate of loss of heat from the sensor and this loss rate can be indicated either by how much the sensor temperature is lowered with a constant source of heat or by how much heat must be added to maintain a fixed temperature within the sensor.

My invention is directed to the structure involving the latter method where a heater within the modulator is the source of heat. A temperature sensitive cycling switch is in effect the thermostat energizing the heater for a portion of the time to maintain a fixed temperature. By selecting the switch resetting temperature close to the room temperature, the sensor in effect becomes a miniature house and controlled heating system. The heater is analogous to the furnace, the switch is analogous to the thermostat, the housing of the sensor is analogous to the walls of the house and its heat losses are proportional to the total weather conditions as is true in a full scale house. Therefore, the percentage of closed time of the switch (to keep the sensor warm) becomes a measure of the house losses and can be used to time throttle the furnace capacity to closely match the heat losses under any given conditions.

Continuous heat flow on a time throttling basis rather than a true fuel flow throttling basis, means that short time cycles must be involved so that the limited thermal mass of the furnace and its system can smooth out the pulses in the manner of a flywheel in a mechanical system.

It is also recognized that all thermostats and temperature regulators sense and measure heat loss and over a long time period throttle the furnace output. In cold weather, the house loses heat more rapidly, and thus the time interval is shortened between furnace operating periods and thus the percentage of on-time is increased. Thermostats with or without anticipator heaters, also tend to provide longer burn intervals in cold weather and shorter intervals in mild weather. However, these conventional systems do not provide the performance necessary for good heating comfort and satisfaction. Thermostats without anticipators result in excessively long burn intervals and room temperature overshoot. Thermostats with anticipators introduce room temperature droop to various degrees depending upon their cycle time adjustment. In an actual test on a thermostat adjusted to produce short cycles, approximating those of my modulating system, room temperature changed by as much as 14° F. between mild weather and very cold weather. Accordingly, it is desirable and my invention provides mechanism for accurately measuring the heat loss due to wind, sun and temperature factors and time throttles the furnace accordingly while providing a short cycling action for a smooth continuous delivery of heat without introducing the undesirable droop.

It is therefore a general object of the present invention to provide a heat changer control that will give substantially greater comfort to the occupants of the home by providing a more even heat input closely matched to the heat losses of the home.

It is a further object of this invention to provide a greater degree of comfort by reducing or eliminating the room temperature droop with increasing heat loads.

It is yet another object of this invention to provide a control circuit in which an outside sensor cycles the heat changer fuel flow in a modified pattern of short pulses while the indoor thermostat measures the resulting room temperature and determines whether heat is required or not.

These and other objects and advantages of the invention will more fully appear from the following description, made in connection with the accompanying drawings, wherein like reference characters refer to the same or similar parts throughout the several views, and in which:

FIG. 1 is a schematic diagram of the invention for use with heating;

FIG. 2 is a schematic diagram of an alternate form of the invention;

FIG. 3 is another schematic diagram of another form of the invention for use with cooling;

FIG. 4 is a diagram showing the differences in temperature variations in a conventional heating system compared to the temperature variations using the invention for cold weather;

FIG. 5 is a diagram showing the differences in temperature variations in a conventional heating system compared to the temperature variations using the invention for mild weather; and FIG. 6 is a structural view of the outdoor heat loos detector with the housing broken away to show the interior.

Referring to FIGS. 4 and 5 it will be noted that the solid lines of the curves indicate the performance of a conventional heating system using a conventional thermostat for both cold weather (FIG. 4) and mild weather (FIG. 5) in terms of the temperature of the air circulated to the rooms or delivered from the furnace plenum. It will be observed that the solid line curves showing the conventional control produce a temperature swing of 71° F. in which the furnace was ON for 7 minutes and OFF for 7 minutes. The temperature deviation extends between 92° and 163° F.

The dashed line shows the performance of the system using my invention where the furnace is on for one and one-half minutes and off for one and one-half minutes producing a temperature variation of 8° F. between 124° and 132° F.

Examining FIG. 5 shows that the conventional heating system, while operating in mild weather requires the furnace to be ON 5 minutes and OFF for 30 minutes producing a temperature swing of 68° F. between 79°. and 147° F.

The dashed lines show a typical operation using my modulating circuit in which the furnace is ON 1 minute and OFF for 6 minutes with an air temperature swing of 12° F. between 83° and 95° F.

Upon an examination of the curves it will be seen that the brief heating intervals become longer in colder weather and the cooling intervals become longer in mild weather to adjust the delivery of the heat pulses to the requirements of the weather conditions.

An analysis of these curves emphasizes that the basic benefits of the invention is the replacement of the prolonged burn intervals with an effectively modulated heating rate, and the resulting prolonging of the heating interval by the basic pulsing acting plus the modification of the time characteristics of these pulses by the outside weather conditions.

It should also be evident that the furnace will be more efficient in converting the fuel to heat because there is a greater temperature differential available to transfer the heat from the flue gases to the plenum circulating air. For example, it has been observed that the circulating air increases in temperature much more slowly above 120° to 130° F. with normal control flame-on intervals. A second saving in fuel costs will result from the steady even heat allowing greater comfort at a lower room temperature thermostat setting. Lower room temperatures result in less heat loss and less fuel consumption. Elimination of the overshoot also reduces the heat loss.

FIG. 1 discloses the most basic configuration of my invention in which a source of electrical energy is converted into a lower voltage by a step down transformer 10, the lower voltage generally being 24 volts for control circuits. A first circuit is established through an outdoor heat loss detector 11 which includes a heat sensitive element 12 that closes a pair of contacts 13 and 14 when the heat sensitive element reaches a predetermined temperature or lower. It has been found that for the best operation in controlling the heat cycle as disclosed earlier, a resetting temperature of approximately 70° F. is preferable. A heating element 15 is connected to the opposite end of heat sensitive element 12 at one end and has its other end connected to the resistive element of a trim resistor. A movable element 17 of the trim resistor is connected to one terminal of the step down transformer and the series circuit is completed by connecting the other terminal of the step down transformer to contact 14. A second circuit is formed by connecting an indoor thermostat 20 to the junction of heat sensitive element 12 and heater 15 through a suitable lead which terminates at a contact 21. A movable element 22 of thermostat 20 is electrically connected to a control device 23 which may be in the form of a solenoid operated gas valve, relay, or other suitable structure which is energizable through a closed voltage circuit. The other terminal of the control device 23 is connected to the secondary terminal transformer 10 where movable element 17 is connected. Thermostat 20 is shown in an opened condition or one in which sufficient heat has been supplied to the room to break the contacts of the thermostat.

FIG. 1 will first be discussed in its simplest form by setting the variable trim resistor so that all of the resistance is removed from the circuit. Under these conditions, the invention is shown schematically in its simplest form. When the outdoor temperature is below 70° F., the outdoor heat loss detector has contacts 13 and 14 engaged completing the electrical circuit to heater 15. As the heater warms the heat sensitive element 12, upon the element reaching its operating temperature or above the contacts are separated and remain so permitting the heat sensitive element 12 to cool and again engage contacts 13 and 14. The elements just described are generally contained within a metal housing 24 (FIG. 6) and the electrical connections to the rest of the circuit are carried out through an electrical cable 25. The elements are disposed within housing 24 so that the sun, wind, and temperature all produce conditions acting upon element 12. As the air becomes colder around the modulator 11, it will take longer to heat the heat sensitive element 12 to the tripping point and it will cool much faster to a resetting condition. Conversely, as the weather becomes warmer, the heat sensitive element 12 will heat much quicker and cool more slowly. Thus both the time interval and the percentage of the time that the switch contacts are closed increases with the conditions in colder weather. Upon the thermostat having switch elements 21 and movable element 22 engaged, the control device 23 which may be a gas valve is energized and opened as long as contact 13 and 14 are closed. Upon contact 13 and 14 opening, even though the thermostat contacts are closed, there is no energy supplied to the control device and a gas valve or other mechanism would be de-energized thus cutting off the supply of fuel. Stated in another manner, the outdoor heat loss detector cycles the control device in a weather modified pattern of short pulses while the thermostat measures the resulting room temperature and initiates heat when needed.

The length of the time that the heat sensitive element 12 keeps contacts 13 and 14 engaged, may be varied by introducing trim resistor 16 into the circuit. As less current flows through trim resistor 16 and heater 15, there will be a smaller amount of heat available to cause deflection of movable element 12 and thus the time that contacts 13 and 14 are closed will be increased.

FIG. 2 is essentially the same as that of FIG. 1 in its simplified form except indoor thermostat 20 is located between the outdoor heat loss detector and the source of energy rather than between the heat loss detector and the control device. As shown in FIG. 2, heating element 15 is connected to the secondary terminal of transformer 10 through a conductor 26. In the operation of this circuit, when the thermostat is open, that is when contacts 21 and 22 are separated, no current flows to heat loss detector 11 and it stops cycling and cools to the outside ambient temperature. When the thermostat again closes, bringing together contacts 21 and 22, an extra long initial burn interval occurs as the sensor is heated to its operation temperature. Another effect is that the sensor heater current in addition to the control device or gas valve current 23 must pass through an anticipator heater of the thermostat. This increases the anticipator effect and in combination with the longer initial burn time, sometimes makes it necessary to readjust the anticipator. This circuit does provide a faster pickup after an open thermostat interval and avoids overly short initial burn intervals as well. The time throttling concept is also applicable to the control of cooling systems as well as heating systems, especially where the cooling system is controlled by gas.

In FIG. 3, step down transformer 100 is connected to control device 230 in a series circuit including cooling thermostat 200 which opens upon reaching the room temperature. A contact 210 is connected to step down transformer 100 and a movable element 220 is connected to an outdoor heat gain detector 110 through the use of a heat sensitive element 120 which disengages a contact 140 upon cooling to a predetermined temperature which may be approximately 90° to 95° F. A heating element 150 is connected in parallel with element 120 and contact 140 to complete the circuit. In this particular instance, a high resistance resistor is selected for heating element 150. Through the use of this circuit, it will be seen that the percent on-time of the cooling system will be increased as the ambient temperature surrounding the heat gain detector 110 increases.

It should also be recognized that other electrical systems may be used and other control devices may be incorporated in carrying out the spirit of the invention. For instance, certain control circuits may employ 110 volt components rather than those of the lower 24 volt type. Additionally, where certain switch contacts are shown and opened and closed through the use of a bimetal member or heat sensitive member, it should also be recognized that certain temperature sensitive components may be used in a circuit having no contacts. For instance, certain semiconductor devices may be used for electronic switching and/or certain semiconductor elements which are temperature sensitive.

It will, of course, be understood that various changes may be made in the form, details, arrangement and proportions of the parts without departing from the scope of the invention which consists of the matter shown and described herein and set forth in the appended claims.

What is claimed is:

1. A heat loss time throttling circuit comprising:
   a. a source of electrical energy;
   b. an outdoor heat loss detector including at least a pair of switch contacts engagable at a predetermined temperature;
   c. a heating element disposed in operable relationship with said heat loss detector;
   d. a first circuit including in series said source of electrical energy, said heating element, and said outdoor heat loss detector;
   e. a control device adapted to be energized for initiating operation of a temperature changing mechanism;
   f. a second circuit connecting said control device in parallel with said heating element;
   g. and an indoor thermostat operatively connected in one of said first and second circuits and disposed within an enclosure and responsive to changes in temperature.

2. The structure set forth in claim 1 including:
   a condition sensitive housing encapsulating said outdoor heat loss detector, said heating element and that portion of said first circuit connecting the same, said housing providing an external enclosure.

3. The structure set forth in claim 2 including:
   means securing said heat loss detector and said heating element in direct contacting relationship with each other.

4. The structure set forth in claim 2 wherein said predetermined temperature is room temperature or lower.

5. The structure set forth in claim 1 including:
   a variable impedance connected in series combination with said heating element within said first circuit, and said second circuit connected in parallel with said series combination.

6. A heat gain time throttling cooling control circuit comprising:
   a. a source of electrical energy;
   b. an outdoor heat gain detector including at least a pair of switch contacts engagable at a temperature range between 90° and 95° F.;
   c. a heating element disposed in operable relationship with said heat gain detector and electrically connected in parallel relationship;
   d. a condition sensitive housing encapsulating said outdoor heat gain detector and said heating element and providing an external enclosure;
   e. a control device adapted to be energized for initiating operation of an air conditioning unit;
   f. an indoor thermostat adapted to be disposed within an enclosure and responsive to changes in temperature;
   g. and a control circuit connecting said indoor thermostat, said control device, and said parallel combination of said heat gain detector and said heating element in series combination with said source of electrical energy.

7. The method of controlling a temperature changing mechanism through a control device energized from a source of electrical energy connected to an outdoor heat loss detector having a heat sensitive switch element and a heating element encapsulated in a condition sensitive housing and operably connected in a first circuit which is further connected to a second circuit including the control device with one of the circuits including an indoor thermostat, the method comprising the steps of:
   a. sensing the temperature within an enclosure and closing the circuit containing the thermostat when said temperature within the enclosure is equal to, or lower than, the selected room temperature of the thermostat;
   b. sensing the outdoor heat loss and closing the first circuit to the source of electrical energy when said heat sensitive switching element reaches a predetermined temperature or lower;
   c. heating the heat sensitive element at least during the period the temperature in the enclosure is equal to or lower than the selected room temperature of the thermostat;
   d. opening the first circuit when said heat sensitive switching element reaches a predetermined resetting temperature or higher;
   e. and recycling the heat sensitive switching element at least during the period the enclosure temperature is equal to or lower than the selected room temperature.

8. The method defined in claim 7 wherein the step of heating the heat sensitive element includes:
   f. controlling the period the control device is energized and unenergized, both of which are substantially shorter periods of time than a cycle controlled by the thermostat.

9. The method defined in claim 8 wherein the step of heating the heat sensitive element includes:
   g. controlling the period the control device is energized to time throttle the capacity of the temperature changing mechanism to an integrated value slightly in excess of the enclosure heat requirements as determined by outside conditions of sun, wind, and temperature.

* * * * *